United States Patent
Nielsen et al.

(10) Patent No.: US 10,087,913 B2
(45) Date of Patent: Oct. 2, 2018

(54) CONTROLLING MOTIONS OF FLOATING WIND TURBINES

(71) Applicant: STATOIL PETROLEUM AS, Stavanger (NO)

(72) Inventors: Finn Gunnar Nielsen, Bones (NO); Bjørn Skaare, Trondheim (NO)

(73) Assignee: STATOIL PETROLEUM, Stavanger (NO)

( * ) Notice: Subject to any disclaimer, the term of this patent is extended or adjusted under 35 U.S.C. 154(b) by 262 days.

(21) Appl. No.: 14/654,231

(22) PCT Filed: Dec. 20, 2013

(86) PCT No.: PCT/EP2013/077841
§ 371 (c)(1),
(2) Date: Jun. 19, 2015

(87) PCT Pub. No.: WO2014/096419
PCT Pub. Date: Jun. 26, 2014

(65) Prior Publication Data
US 2015/0354532 A1   Dec. 10, 2015

(30) Foreign Application Priority Data
Dec. 20, 2013 (GB) .................................. 1223088.4

(51) Int. Cl.
*F03D 7/02* (2006.01)
*F03D 11/04* (2006.01)
*F03D 13/25* (2016.01)

(52) U.S. Cl.
CPC ......... *F03D 7/0204* (2013.01); *F03D 7/0224* (2013.01); *F03D 13/25* (2016.05);
(Continued)

(58) Field of Classification Search
CPC ...... F03D 7/0204; F03D 7/0224; F03D 11/04; F05B 2240/90; F05B 2240/93;
(Continued)

(56) References Cited

U.S. PATENT DOCUMENTS 6,138,598 A * 10/2000 Askestad ............... B63H 25/00
114/230.1
2007/0040388 A1* 2/2007 Nielsen ................. B63B 21/502
290/55

(Continued)

FOREIGN PATENT DOCUMENTS

| CN | 102536655 | 7/2012 |
| CN | 102644546 | 8/2012 |

(Continued)

OTHER PUBLICATIONS

International Search Report dated Mar. 25, 2014 in International Application No. PCT/EP2013/077841.
(Continued)

*Primary Examiner* — Igor Kershteyn
(74) *Attorney, Agent, or Firm* — Wenderoth, Lind & Ponack, L.L.P.

(57) ABSTRACT

A motion controller for a floating wind turbine with a plurality of rotor blades, is arranged to control a motion of the floating wind turbine in a yaw direction. The controller adjusts the blade pitch of each rotor blade so as to create a net force to control the motions. The controller includes a control action which is proportional to a yaw offset angle and/or a control action which is proportional to an integral of the yaw offset angle.

23 Claims, 3 Drawing Sheets

(52) U.S. Cl.
CPC ....... *F05B 2240/93* (2013.01); *F05B 2260/96* (2013.01); *F05B 2270/705* (2013.01); *F05D 2210/12* (2013.01); *F05D 2240/90* (2013.01); *Y02E 10/721* (2013.01); *Y02E 10/723* (2013.01); *Y02E 10/727* (2013.01)

(58) Field of Classification Search
CPC ............ F05B 2260/96; F05B 2270/705; F05D 2210/12; Y02E 10/721; Y02E 10/723; Y02E 10/727
See application file for complete search history.

(56) References Cited

U.S. PATENT DOCUMENTS

| | | | |
|---|---|---|---|
| 2007/0041837 A1* | 2/2007 | Ide | F03D 7/0224 416/147 |
| 2007/0212209 A1 | 9/2007 | Borgen | |
| 2008/0260514 A1* | 10/2008 | Nielsen | F03D 7/0224 415/4.3 |
| 2009/0068013 A1 | 3/2009 | Birkemose et al. | |
| 2009/0120345 A1* | 5/2009 | Sveen | B63B 21/50 114/264 |
| 2011/0140420 A1 | 6/2011 | Loh et al. | |
| 2011/0179986 A1* | 7/2011 | Nielsen | B63B 21/00 114/121 |
| 2011/0204636 A1 | 8/2011 | Scholte-Wassink et al. | |
| 2011/0299986 A1 | 12/2011 | Yoshida | |

FOREIGN PATENT DOCUMENTS

| | | |
|---|---|---|
| EP | 2 037 119 | 3/2009 |
| EP | 2 395 236 | 12/2011 |
| EP | 2 489 872 | 8/2012 |
| JP | 2012-62757 | 3/2012 |
| WO | 2007/053031 | 5/2007 |
| WO | 2010/076557 | 7/2010 |

OTHER PUBLICATIONS

Written Opinion of the International Searching Authority dated Mar. 25, 2014 in International Application No. PCT/EP2013/077841.
Search Report dated May 9, 2013 in corresponding Great Britain Application No. 1223088.4.
Machine translation of JP 2012-62757 filed Mar. 29, 2012.

* cited by examiner

CONTROLLING MOTIONS OF FLOATING WIND TURBINES

BACKGROUND OF THE INVENTION

1. Technical Field

The present invention relates to controlling motions of floating wind turbines. More specifically, it relates to rotor blade pitch control for floating wind turbine installations.

2. Description of the Related Art

A wind turbine installation is usually formed of a support structure comprising an elongate tower, with a nacelle and a rotor attached to the upper end of the support structure. The generator and its associated electronics are usually located in the nacelle.

Fixed-base wind turbines that are fixed either to the land or the sea bed are well-established.

However, recently there has been a desire to develop floating wind turbines and various structures have been proposed. One example is a wind turbine installation where a conventional wind turbine structure is mounted on a buoyant base such as a platform or raft-like structure. Another proposal is a "spar buoy" type structure. Such a structure is formed of an elongate buoyant support structure with a rotor mounted on the top. The support structure could be a unitary structure or it could be an elongate sub-structure with a standard tower mounted thereon.

Floating wind turbine installations may be moored to the sea bed via one or more mooring lines with anchors, or attached to the sea bed with one or more articulated (hinged) legs, for example, in order to hold them at their desired installation sites.

Fixed foundation wind turbines are rigidly secured to a landmass at one end and as a result when acted on by forces, such as those caused by changes in wind speed or direction, act as a cantilevered mass and vibrate as they bend. These motions have a small amplitude but high frequency, i.e. they are small fast motions. In contrast, floating wind turbines are not rigidly secured to a land mass and as a result the whole elongate structure can move in a rigid body manner.

When a floating wind turbine is acted on by forces, such as those caused by changes in wind speed or waves, the whole structure moves about in the water. These motions may have a large amplitude but relatively low frequency, i.e. they are large slow motions. (The motions are low frequency in the sense that they are much lower than the rotational frequency of the turbine itself). The motions experienced are heave which is the linear vertical (up/down) motion, sway which is the linear lateral (side-to-side) motion, surge which is the linear longitudinal (front/back) motion, roll which is the rotation of the body about its horizontal (front/back) axis, pitch which is the rotation of the body about its transverse (side-to-side) axis and yaw which is the rotation of the body about its vertical axis.

In certain circumstances, these motions can reduce the overall efficiency or power output of the wind turbine and, moreover, can create excessive structural stresses which can damage or weaken the wind turbine structure or could cause instability in the motions of the floating wind turbines. There is therefore a desire to control these rigid body motions.

It is known from WO 2007/053031 and WO 2010/076557 to provide a floating wind turbine with a controller which is arranged to damp resonant surge and pitch motions (axial motions).

In conventional wind turbines, the pitch of the rotor blades is controlled in order to regulate the power output. When operating in winds below a certain wind speed (which is referred to as the rated wind speed of a wind turbine), the blade pitch is kept approximately constant at an angle that provides maximum power output. In contrast, when operating above the rated wind speed, the blade pitch is adjusted in order to produce a constant power output and prevent excessively high power outputs that could damage the generator and/or its associated electronics. This constant power is referred to as the rated power of the wind turbine.

When operating below the rated wind speed, as the blade pitch is kept approximately constant, the thrust acting on the rotor increases with the wind speed (thrust being approximately proportional to the square of the wind speed relative to the rotor). As a result, axial motions (which increase the relative wind speed) are damped.

In contrast, when operating above the rated wind speed the blade pitch is adjusted such that the thrust on the rotor decreases with increasing wind speed in order to produce a constant power output. As the wind speed increases, the blade pitch is increased, i.e. made more parallel to the wind direction, in order to reduce the thrust.

Using the pitch control described above for constant power output, in response to an increase in the rotor torque or speed, the blade pitch angle is adjusted to reduce the torque acting on the rotor and, as a result, reduce the thrust and thereby maintain constant power. However, as the thrust is reduced, the damping force acting on the wind turbine's vibrations is also reduced and can become negative. In other words, the vibrations can be exacerbated and their amplitude increases. This then results in a further change in the relative wind speed and a further adjustment to the blade pitch, making the vibrations even larger. The opposite applies when the wind turbine is moving away from the wind, resulting in a further exacerbation of the vibrations. This is known as negative damping.

WO 2007/053031 and WO 2010/076557 describe turbine controllers which are designed to counteract the problem of negative damping, which occurs above rated wind speed, and to reduce resonant low frequency motion in the axial direction. This is achieved by collectively adjusting the pitch of the blades to create a damping and/or restoring force in the axial direction.

In addition to motion of the nacelle in the wind direction (or axial direction as the nacelle is heading into the wind), motion in the plane of the rotor, i.e. in-plane motions, (combined platform sway and roll) as well as yaw motions (rotation about a vertical axis) may occur. The combined sway and roll motion may be excited by a variation in aerodynamic or generator torque, for example, and the yaw motion by uneven flow over the rotor-disk, due to the wake effect of up-wind turbines, for example. Different from the surge and pitch motion, the sway, roll and yaw motions are normally not unstable. However significant amplitudes of motions may be excited both below and above rated wind speed. These motions particularly become an issue as the size of the turbine increases beyond today's state of art turbines.

If the frequencies of the wind loads are significantly higher than the natural frequencies in sway, roll and yaw, the inertia effects will cause the platform motion response to be small. On the other hand, if the excitation frequency is much lower than the natural frequencies, a quasi-static motion response will take place. This motion response will be limited by hydrostatic and mechanical (mooring) restoring forces. Thus floating wind turbines are typically designed so that the natural frequencies lie outside the range of excitation frequencies. However, this is not always possible and if the excitation forces have frequencies close to any of the roll, sway or yaw natural frequencies, large and undesired motion responses may take place. This is particularly the case if the mentioned modes of motion are lightly damped, e.g. there is not sufficient large aero- or hydro-dynamic damping to limit the resonant response. In certain cases, e.g. for yaw, large motions may occur even if the excitation is not very close to the natural frequency.

EP 2489872 discloses a wind turbine having a blade-pitch system for individually controlling the blade-pitch angle of each rotor blade of the wind turbine. The wind turbine may comprise a yaw-rate sensor and a computational unit which calculates a pitching command which leads to aerodynamic forces being generated on the blades that attenuate the gyroscopically induced loads on the blades due to the yaw-rate.

SUMMARY OF THE INVENTION

In a first aspect the present invention provides a controller for a floating wind turbine with a plurality of rotor blades, wherein the controller is arranged to adjust the blade pitch of each rotor blade so as to create a net force to control a motion of the floating wind turbine in a yaw direction. The controller includes a control action which is proportional to a yaw offset angle and/or a control action which is proportional to an integral of the yaw offset angle.

The controller may also include a control action which is proportional to the derivative of the yaw offset. However, preferably the control action does not comprise a control action which is proportional to the derivative of the yaw offset.

The previously described principles for damping the axial motion are based upon a collective pitch adjustment of the turbine blades. Assuming a homogenous in-flow to the turbine this gives no forces in a non-axial direction (e.g. yaw or in-plane directions). The blades are pitched such that the axial resonant motion are given a positive damping force, i.e. a force opposing the axial velocity of the turbine in a frequency range close to resonance.

The inventors of the present invention realized that forces in directions other than the axial direction can be induced, for example yaw forces (as well as in-plane forces), by means of individual and/or independent dynamic pitching (i.e. pitch change) of the rotor blades.

The rigid body motions of floating wind turbines have natural periods which are long compared to the period of rotor rotation. This means that the motions may be accurately controlled by appropriate amplitude, frequency and phasing of the blade pitching.

The motion control may be used both above and below rated wind speed.

The controller is arranged to control a motion in the yaw direction. This motion may be caused for example by uneven air flow over the rotor-disk. It is desirable to be able to control the yaw motions of a floating body which could affect the efficiency of the wind turbine or damage parts of the structure such as the anchoring arrangement.

The yaw motion control may be achieved by individually pitching the rotor blades so as to create a rotational force about the vertical axis which controls the yaw excursion (displacement) and optionally the yaw velocity. This may be achieved by dynamically adjusting the pitch of the blades so that an additional blade angle is provided when passing one side of the rotor cycle and providing a corresponding additional negative blade angle when passing the opposite side of the rotor cycle. This may be a gradual and continual change. By varying this force with the yawing motion, the yaw motion can be controlled to a desired value or within a desired threshold. The desired value is typically a yaw position in which the rotor is facing into the wind, i.e. the rotor shaft is parallel to the wind direction. The desired threshold hold may be plus or minus 3, 4, 5, 6, 7 or 8 degrees of the desired value. For example, the threshold may be between 3 and 8 degrees or 4 to 6 degrees.

The controller may be a proportional-integral-derivative controller (PID controller), i.e. a controller which comprises a proportional control action, an integral control action and/or a derivative control action. These control actions are with respect to a yaw off-set value which may be defined as the yaw angle between the absolute or actual yaw value and a desired yaw value (which typically is a yaw position in which the rotor shaft of the wind turbine is parallel to the wind direction). The PID controller may be called a proportional controller (P controller) in the absence of an integral control action and a derivative control action, an integral controller (I controller) in the absence of a proportional control action and a derivative control action, a proportional-integral controller (PI controller) in the absence of a derivative control action and so forth (with all the other permutations).

Preferably the present invention comprises a PI controller. These proportional and/or integral control actions may be with respect to a yaw off-set value (which may be the angle between the actual yaw position and the desired yaw position). An effective controller can be achieved using a controller with only a proportional control action or only an integral control action (with respect to yaw off-set angle). However, a more accurate motion control may be achieved when both proportional and integral control actions (with respect to yaw off-set) are used. Alternatively, there may be certain control schemes in which only proportional control action is desirable.

Motion controllers typically only use derivative control actions; this is because it is normal practice to damp the motions rather than to control them.

The present invention may comprise a control schedule incorporating proportional, integral, and derivative yaw motion control actions which is formulated as $$\beta_{ref,i} = \beta_c + \beta_{iy},$$

where $\beta_{ref,i}$ is the blade pitch angle reference signal for blade i, $\beta_c$ is the collective blade pitch angle reference signal for all blades (including possibly active pitch motion damping control), while $\beta_{iy}$ is the additional yaw individual blade pitch angle reference for blade i. $\beta_{iy}$ may be represented as $$\beta_{iy} = \left( K_{py}\theta + K_{iy} \int_{t_0}^{t} \theta(\tau)d\tau + K_{vy}\dot{\theta} \right) \sin(\phi_i),$$

where $\theta$ is the tower yaw angle (the angle between the actual yaw position and a desired yaw position), $\dot{t}$ is the tower yaw angular velocity, $K_{iy}$ is the integral controller gain, $K_{py}$ is the proportional controller gain and $K_{vy}$ is the derivative controller gain and $\phi_i$ is the azimuth angle of rotor blade i.

Optionally, the derivative controller gain $K_{vy}$ may be set to zero. In other words, the controller may effectively not comprise a derivative control action. Additionally, the integral or the proportional controller gain may be set to zero (so that there is either no proportional control action or no integral control action).

The inventors of the present invention have realised that proportional and integral control actions are advantageous for yaw motion control in controllers for floating wind turbines because the yaw motion is slowly varying with changes in wind field. As a result, the effect of the derivative control action may be negligible and the inventors realised that an effective yaw controller could be provided using proportional and/or integral controller actions (proportional and integral of the yaw off-set, i.e. angle between the absolute yaw value and the desired yaw value) and that a derivative control action is not essential.

The derivative control action may be applied to respond to rapid changes in the system response relative to the system's desired reference, proportional control action may be applied to respond to slower changes and deviations in the system response relative to the system's desired reference and integral control action may be applied to avoid a non-zero offset between the system response and the system's desired reference at a steady state.

The controller may be arranged to control yaw motion to a desired yaw reference value $\theta_{ref}$, i.e. desired yaw position. This may be achieved by the following control variable:

$$\bar{\theta} = \theta - \theta_{ref}$$

where $\theta$ is the actual yaw position. Typically the desired yaw reference value will be the position in which the rotor faces into the wind, i.e. when the rotor shaft is parallel to the wind direction.

Insertion of this control variable into the above equation gives $$\beta_{iy} = \left(K_{py}\bar{\theta} + K_{iy}\int_{t_0}^{t}\bar{\theta}(\tau)d\tau + K_{vy}\dot{\theta}\right)\sin(\phi_i),$$

This controller will then control yaw motions to the desired reference value.

The controller may be arranged to only control yaw motion when the absolute yaw value (abs($\theta$)) exceeds a certain limit, i.e. abs($\theta$)>$\theta_{limit}$≥0. This may be achieved by the following control variable with the following constraints:

$$\tilde{\theta} = \begin{cases} \theta - \theta_{limit}, & \text{for } \theta > \theta_{limit} \\ \theta + \theta_{limit}, & \text{for } \theta < -\theta_{limit} \\ 0, & \text{for } -\theta_{limit} \leq \theta \leq \theta_{limit} \end{cases}$$

Insertion of this control variable into the above equation gives $$\beta_{iy} = \left(K_{py}\tilde{\theta} + K_{iy}\int_{t_0}^{t}\tilde{\theta}(\tau)d\tau + K_{vy}\dot{\theta}\right)\sin(\phi_i),$$

This controller will then only control yaw motions when the yaw offset, i.e. the angle between a desired position and an actual position, is greater than a threshold angle.

The controller may be arranged to control yaw motions and not control in-plane motions (which may either be acceptable or may be controlled by another means such as an anchoring arrangement). The controller may be arranged to control yaw motions.

Alternatively, the controller may be arranged to also control motion in the in-plane direction. Motion in the in-plane direction is due to the combined roll and sway motions and may be caused by variations in aerodynamic or generator torque for example. It is desirable to be able to control the side-to-side motions of a floating body which could affect efficiency of the wind turbine or in more severe cases damage the floating wind turbine.

In a second aspect, the present invention provides a motion controller for a floating wind turbine with a plurality of rotor blades, wherein the controller is arranged to adjust the blade pitch of each rotor blade so as to create a net force to control a motion of the floating wind turbine in a yaw direction and in an in-plane direction.

The invention of the second aspect may be combined with one or more the features discussed in relation to the other aspects of the invention.

The in-plane control may be achieved by individually pitching the rotor blades so as to create a force in the rotor plane direction which counteracts the in-plane velocity and/or in-plane excursion (displacement). This may be achieved by dynamically adjusting the pitch of the blades so that an additional blade angle is provided when the blade is in the top half of the rotor cycle and a corresponding additional negative blade angle is provided when the blade in the bottom half of the rotor cycle. For example, the pitch may be adjusted continuously and gradually whilst rotating so that a gradually increasing and then decreasing blade pitch is provided in the top half of the rotor cycle and a gradually decreasing and then increasing blade pitch is provided in the bottom half of the rotor cycle. Preferably an additional blade angle is provided when passing the top position of the rotor cycle and a corresponding negative blade angle is provided when passing the bottom position of the rotor cycle which provides a net in-plane force. By varying the amplitude of the additional blade pitch angle and thus varying the force with a frequency equal to the natural frequency of the in-plane motion a net damping effect can be obtained.

The controller may additionally be arranged to control a motion in the axial direction. A motion in the axial direction is due to the combined surge and pitch motions and may, for example, be caused by a varying wind velocity which causes an axial force. As discussed above, in certain circumstances, this force can lead to severe unstable motions. This control is achieved by dynamically and collectively pitching the rotor blades to create an axial force on the rotor which opposes the motion.

It was realized that motion control in directions other than the axial direction has only a minimum impact on the axial forces and so could be used in combination with controls for axial motion.

Preferably the controller is arranged to control the motion of the floating wind turbine in a plurality of directions, whether translational or rotational, simultaneously. For example, the control may control in-plane motions and/or axial motions in addition to yaw motions and may control in-plane motions, yaw motions and axial motions at the same time.

When designing a control system according to an embodiment of the invention, it may be assumed that the yaw motion, the horizontal in-rotor-plane motion and the horizontal-axial motion of the nacelle in most cases are almost orthogonal. In other words, it may be assumed that introducing forces in one of the directions will have a minor effect in the other directions, i.e. there are assumed to be negligible interaction effects. However, this assumption is not essential and in more advanced controls the coupling effects between the different modes of motions may be accounted for.

The simultaneous control may be achieved by determining the necessary blade pitch for each of the blades to control each of the motions and then combining each of the individual blade pitch components to calculate a total dynamic variation.

Preferably the controller is adapted to calculate a dynamic and collective pitch for all of the plurality of rotor blades to counteract an axial motion of the floating wind turbine to obtain a first adjustment, calculate a dynamic and individual blade pitch for each of the plurality of blades to counteract a yaw motion of the floating wind turbine to obtain a second adjustment; calculate a dynamic and individual blade pitch for each of the plurality of blades and/or a variation in rotor torque to counteract an in-plane motion of the floating wind turbine to obtain a third adjustment; and combine the first, second and third adjustments to cause simultaneous control of the axial motions, yaw motions and in-plane motions of the floating wind turbine.

Preferably the controller is arranged to adjust the blade pitch of each rotor blade with a phase relative to the floating wind turbine in-plane and/or axial motion velocity so as to provide a damping force.

Additionally, or alternatively, the controller is arranged to adjust the blade pitch of each rotor blade with a phase relative to the floating wind turbine yaw, in-plane and/or axial motion displacement so as to provide a restoring force.

By damping force, it is meant a force which opposes the motion velocity as opposed to a restoring force which acts to oppose the motion excursion (displacement).

The phase of the rotor blade pitch motion relative to the motion velocity can be varied so that the force is either in phase with the motion velocity to create a damping force or in phase with the motion excursion (displacement) to create a restoring force. The controller may be tuned to obtain an optimum balance between damping and restoring forces. This may be achieved for each of the motions (yaw, in-plane and/or axial motions).

Optionally the controller is further arranged to control the torque of the load presented to the rotor to control a motion in the in-plane direction. In other words, the controller may be arranged to control the resistance to rotation of the rotor, i.e. meaning that for a given wind speed and blade pitch the rotor speed can be controlled. This load may be a generator load.

This provides a way of controlling the in-plane motions without having to adjust the blade pitch. This could result in a more efficient system or more accurate control of the in-plane motions.

This may be achieved by modifying the original generator torque control system to have an additional component in the generator torque reference signal that is proportional to the in-rotor plane tower velocity.

Control of the in-plane motions by means of controlling the generator torque may be used alternatively or additionally to the control of the in-plane motions by means of individual and dynamic blade pitching.

In fact, the control of the torque of the load presented to the rotor to control a motion in the in-plane direction is of independent patentable significance as outlined below in relation to the third aspect of the invention.

The controller may be arranged to receive a measurement of the velocity of the motion of the floating wind turbine to be controlled. In other words, the floating wind turbine may comprise a motion sensor. For example, the measurement may be a yaw velocity, an in-plane velocity and/or an axial velocity.

The controller may be arranged to receive a measurement of a displacement from a desired position (e.g. an upright position and/or a position facing into the wind such that the rotor shaft is parallel to the wind direction). The measurement may be a yaw angle, an in-plane displacement or an axial displacement.

This means the principle of controlling the motions of the floating wind turbine can be achieved irrespective of whether the motions are harmonic or stochastic. The measurement may for example be the in-rotor-plane velocity and/or the yaw velocity and/or motion and/or acceleration. Preferably the measurement is taken at the nacelle level. The velocity may be an estimate based on other measurements. For example, the velocity may be measured by use of an accelerometer attached to the nacelle or by any other known method.

When the motion velocity measurement is input it is preferable for the controller to use a low pass filter on the velocity input. Generally, if a measurement indicative of motion is received it is preferable for it to be filtered so that motions with a certain range of frequencies can be controlled by the controller.

This ensures that the controller can act on the motions within a specific frequency range, for example at or near the resonant frequency. For example, in relation to roll motions it is desired to provide damping at or near the natural frequency of the roll motion and to consider higher frequencies, such as wave frequencies, as undesired disturbance. The filter may be a second order Butterworth filter.

It is preferable for the filter to prevent the controller acting on wave induced motions. In other words, the filter should be arranged so that the controller only acts in response to wind induced motions. This may be achieved by filtering out motions in the frequency range of the wave induced motions. It is desirable for the wave-induced motions to be filtered out because control of wave-induced motions may lead to damage on the wind turbine components, such as the rotor blades.

Preferably the controller is arranged to operate only when the motion to be controlled is above a certain limit or threshold value. In other words, the control of the motions does not need to be activated continuously. This can prevent the controller unnecessarily responding to minor motions which do not cause an issue in the operation of the floating wind turbine.

In a third aspect the present invention provides a motion controller for a floating wind turbine with a plurality of rotor blades, wherein the controller is arranged to adjust the blade pitch of each rotor blade so as to create a net force to control a motion of the floating wind turbine in a direction other than the axial direction, wherein the controller is arranged to only control a motion of the floating wind turbine when that motion exceeds a certain threshold.

This aspect may be combined with one or more of the features discussed in relation to the other aspects.

For example, in relation to yaw motions the controller may be arranged to operate only when the yaw off-set angle (the angle between the actual yaw position and a desired yaw position) is above a threshold yaw value. This threshold yaw value may, for example, be an off-set angle of 5 degrees, i.e. plus or minus 5 degrees relative to a desired yaw position.

The controller may operate only when the displacement from a desired position is greater than a threshold displacement.

This reduces the amount of blade pitching activity which can reduce wear and tear on the pitch mechanism.

The controller may comprise a motion monitoring system that detects if the motions exceed certain limits, e.g. if the displacement exceeds a threshold displacement (from a desired position). If a certain predetermined limit is exceeded, then the controller may be activated.

The invention also extends to a corresponding control method. Thus, viewed from a fourth aspect, the invention provides a method of controlling a floating wind turbine structure comprising a plurality of rotor blades, the method comprising: adjusting the blade pitch of each rotor blade so as to create a net force to control a motion of the floating wind turbine in a yaw direction wherein a blade pitch adjustment is calculated using a controller which includes a control action which is proportional to a yaw offset angle and/or a control action which is proportional to an integral of the yaw offset angle.

The method preferably incorporates the optional and preferable features discussed above in relation to the first aspect of the invention.

As will be apparent to a person skilled in the art, the controller will normally be provided in the form of software. Thus the controller comprises a processor for running this software. The processors could be microprocessors, for example.

The present invention also relates to a software product comprising instructions which when executed by a processor cause the processor to control a floating wind turbine structure such that the blade pitch of each rotor blade is adjusted so as to create a net force to control a motion of the floating wind turbine in a yaw direction, wherein a blade pitch adjustment is calculated using a controller which includes a control action which is proportional to a yaw offset angle and/or a control action which is proportional to an integral of the yaw offset angle.

Preferably the software product is a physical data carrier. For example, a CD or solid state memory.

Alternatively, or in addition, the software product could be provided in the form of instructions transmitted over a network, such as downloaded over the Internet, for example.

The present invention also relates to a method of manufacturing a software product which is in the form of a physical carrier, comprising storing on the data carrier instructions which when executed by a processor cause the processor to control a floating wind turbine structure such that the blade pitch of each rotor blade is adjusted so as to create a net force to control a motion of the floating wind turbine in a yaw direction, wherein a blade pitch adjustment is calculated using a controller which includes a control action which is proportional to a yaw offset angle and/or a control action which is proportional to an integral of the yaw offset angle.

In a fifth aspect the present invention provides a motion controller for a floating wind turbine with a plurality of rotor blades, wherein the controller is arranged to adjust the torque of the load presented to the rotor to control a motion in the in-plane direction.

The features of the fifth aspect may be applied in combination with any of the preferable or optional features of the aspects discussed above.

In its broadest aspect the present invention provides a motion controller for a floating wind turbine with a plurality of rotor blades, wherein the controller is arranged to adjust the blade pitch of each rotor blade so as to create a net force to control a motion of the floating wind turbine in a direction other than the axial direction. The invention also provides a corresponding control method. In other words, the present invention provides a method of controlling a floating wind turbine structure comprising a plurality of rotor blades, the method comprising: adjusting the blade pitch of each rotor blade so as to create a net force to control a motion of the floating wind turbine in a direction other than the axial direction. These broad aspects may be combined with one or any combination of the additional features described above.

BRIEF DESCRIPTION OF THE DRAWINGS

A preferred embodiment of the invention will now be described by way of example only and with reference to the accompanying figures in which.

DETAILED DESCRIPTION OF THE INVENTION

Figure 5:
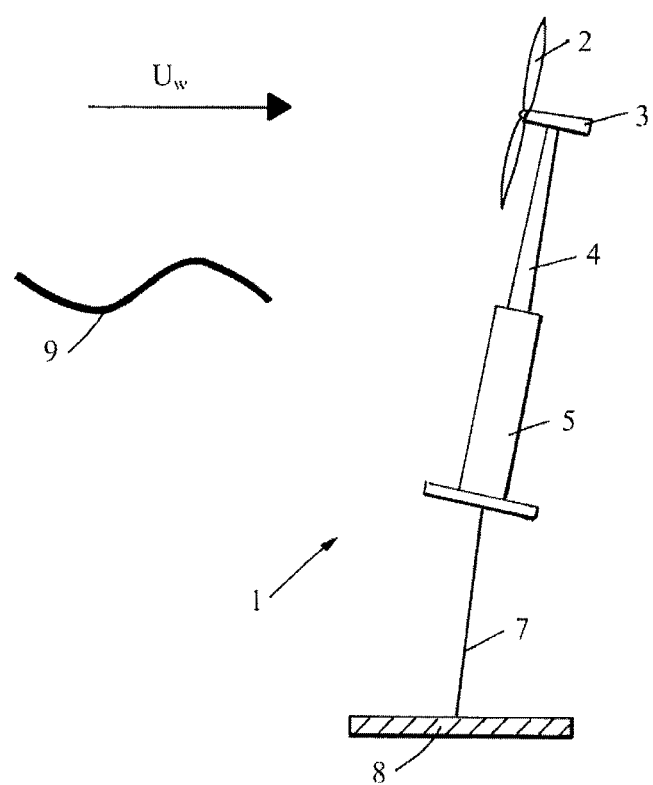
FIG. 5 shows a wind turbine incorporating a controller according to an embodiment of the invention.

Turning first to FIG. 5, there is illustrated a floating wind turbine assembly 1. It comprises a turbine rotor 2 mounted to a nacelle 3. The nacelle is in turn mounted to the top of a structure which comprises a tower 4 secured to the top of a floating body 5, which in the example shown is a spar-buoy like structure. The disclosed principles of controlling motions are applicable to all floating structures for floating wind turbines. The floating body is secured to the sea bed by one or more anchor lines 7 (only one is shown), these could be taut or catenary mooring lines. The nacelle contains an electrical generator which is connected to the turbine rotor by any known means such as a reduction gearbox, by direct connection to the electrical generator or hydraulic transmission etc (these items are not shown). The nacelle also contains a control unit.

The floating wind turbine is subject to incoming wind $U_w$, forces and wave 9 forces. (The waves 9 on the water's surface are shown schematically.) These forces will cause the floating wind turbine assembly 1 to move about in the water.

The control in the nacelle is arranged to determine a blade pitch adjustment necessary to control the motions of the floating wind turbine. The controller is further arranged to adjust the blade pitch of each rotor blade independently so as to create a net force to control a motion of the floating wind turbine in an axial direction, an in-plane direction and a yaw direction.

If the axial motion is to be damped in a frequency range close to the resonance frequency $\omega_x$, a force must be created that opposes the axial velocity of the rotor motion. If a dynamic and collective blade pitch motion is performed at frequency $\omega_x$ and amplitude $\Delta\beta_{0A}$ an axial force (thrust) on the rotor opposing the axial motion may be obtained. For a harmonic axial motion, the blade pitch angle should be $$\beta = \beta_0 + \Delta\beta_{0A} \cos(\omega_x t + \alpha_0) \quad [1]$$

Here $\beta_0$ is the pitch angle that is set out by the conventional controller aiming) for constant power production. $\Delta\beta_{0A} \cos(\omega_x t + \alpha_0)$ is the additional blade pitch angle to achieve damping. $\alpha_0$ is a phase angle between the axial velocity and the maximum pitch angle and t is time.

If the in-plane motion is to be controlled in a frequency range close to the resonance frequency for in-plane motion $\omega_y$, a force must be created that opposes the in-plane velocity and/or the in-plane excursion of the rotor motion. If a dynamic blade pitch motion is performed giving an additional angle $\Delta\beta$ when passing the top position and a corresponding $-\Delta\beta$ when passing the lower position, a net in-plane force is obtained due to the changed lift forces on the blade. If this in-plane force then is varied with a frequency equal to the natural frequency of the in-plane motion, a net damping effect may be obtained. For a harmonic in-plane motion with frequency $\omega_y$ and a rotor frequency $\Omega$ the blade pitch of each of the blades should have an individual pitch of the form:

$$\Delta\beta_{yj} = \Delta\beta_{yA} \cos(\omega_y t + \alpha_y)\cos(\Omega t + \theta_{j0} + \gamma_y) \quad [2]$$

In this example cosine harmonic functions are used to provide a smooth pitch angle variation and thus smooth force variation. However, any smooth periodic function with the prescribed frequency could be applied.

Here j is the blade number (j=1, 2 or 3 for a three bladed rotor), $\Delta\beta_{yA}$ is the amplitude of the blade pitch angle, $\alpha_y$, $\gamma_y$ are phases of the blade pitch motion relative to the in-plane velocity and the top point position of the blade respectively, $\theta_{j0}$ is the phase corresponding to the initial position of each blade on the rotor, i.e. for a three bladed rotor $\theta_{j0} = 2\pi/3(j-1)$. $\alpha_y$ can be varied so that the force is either in phase with the in-plane velocity (damping) or in phase with the in-plane excursion (restoring). For a harmonic oscillation these components have always a phase difference of $\pi/2$. The control may be tuned to both provide a restoring and a damping effect.

To generate a dynamic yaw moment, a similar principle as for the in-plane motion may be used. The yaw natural frequency replaces the in-plane natural frequency in [2], and the phases are changed to generate a yaw force rather than an in-plane force. Alternatively, the yaw frequency does not need to correspond to the yaw natural frequency and may also change over time. In the special case of harmonic motion, this may be represented as $$\Delta\beta_{6j}(t) = \Delta\beta_{6A} \cos(\omega_6 t + \alpha_6)\cos(\Omega t + \theta_{j0} + \gamma_6) \quad [3]$$

$\gamma_6$ is typically $\gamma_y \pm \pi/2$. As with the in-plane motion, the phase angle $\alpha_6$ may be tuned to obtain an optimum balance between damping and restoring forces.

The total dynamic variation of the blade pitch angle will approximately be the sum of the three individual components of $\Delta\beta$ above. The interaction effects between the forces depend upon the relation between the natural frequencies involved and the non-linearity in the lift and drag forces. A certain blade pitch angle will change the angle of attack close to the rotor axis more than close to the tip. For that reason, an individual tuning of the contributions should be performed to obtain the wanted motion reduction and avoid as far as possible negative impacts as reduced power production and increased blade loads. The above in-plane damper and yaw motion control principles do not need to be activated continuously. For example, one may have a motion monitoring system that detects if the motions (e.g. displacements) exceed certain limits, i.e. a certain threshold, and then activate the control system accordingly.

If the in-plane (resonant) motion (roll) is excited by variation in the aerodynamic or generator torque, an alternative control option is available: That is to modify the generator torque controller to impose damping in the relevant frequency interval. This can be achieved by modifying the original generator torque control system to have an additional component in the generator torque reference signal that is proportional to the in-rotor plane tower velocity. For harmonic in-plane motion the generator torque reference can be formulated as $$T_{ref} = T_{ref,0}(1 + \Delta T_{yA} \cos \omega_y t), \quad [4]$$

where $T_{ref,0}$ is the original generator torque reference signal and $\Delta T_{yA}$ is the relative amplitude of the additional torque control reference signal for active in-plane damping. This can be used in addition to the motion control which is achieved by pitching of the rotor blades or used on its own when it is desired to only control the in-plane motions.

The principle of desired blade pitch angle for generating an in-rotor-plane harmonic force given in equation [2] can be applied to a control scheme with a generally non-harmonic behaviour based on a measurement of the in-rotor-plane velocity of a floating wind turbine.

Consider a measurement of the in-rotor-plane horizontal velocity $\dot{y}_n$, measured at the nacelle level. Then, an active in-plane damping control scheme can be formulated as $$\beta_{ref,i} = \beta_c + \beta_{ir}, \quad [5]$$

where $\beta_{ref,i}$ is the blade pitch angle reference signal for blade i, $\beta_c$ is the collective blade pitch angle reference signal for all blades (including possibly active pitch motion damping control), while $\beta_{ir}$ is the additional in-plane individual blade pitch angle reference for blade i which is controlled to give an in-rotor plane damping force by the equation:

$$\beta_{ir} = K_{vr} \dot{y}_n \cos(\phi_i), \quad [6]$$

where $K_{vr}$ is the in-plane damping controller gain and $\phi_i$ is the azimuth angle of blade i. It is often desired to provide additional damping at the natural frequency of the in-plane motion, and to consider higher frequencies like the wave frequencies as undesired disturbance. It can therefore be advantageous to use a low pass filter on the in-rotor-plane horizontal velocity $\dot{y}_n$. In Laplace form a second order Butterworth filtering of $\dot{y}_n$ can be represented as $$\dot{y}_{nf}(s) = \frac{\omega_c^2}{s^2 + \sqrt{2}\,\omega_c s + \omega_c^2} \dot{y}_n(s), \quad [7]$$

where $\omega_c$ is the cut-off frequency in the low pass filter and $\dot{y}_{nf}$ is the filtered nacelle velocity. An in-rotor-plane control scheme with low pass filtering can then be by formulated by combining equation [6] and equation [7]:

$$\beta_{ir} = K_{vr} \dot{y}_{nf} \cos(\phi_i) \quad [8]$$

Figure 1:
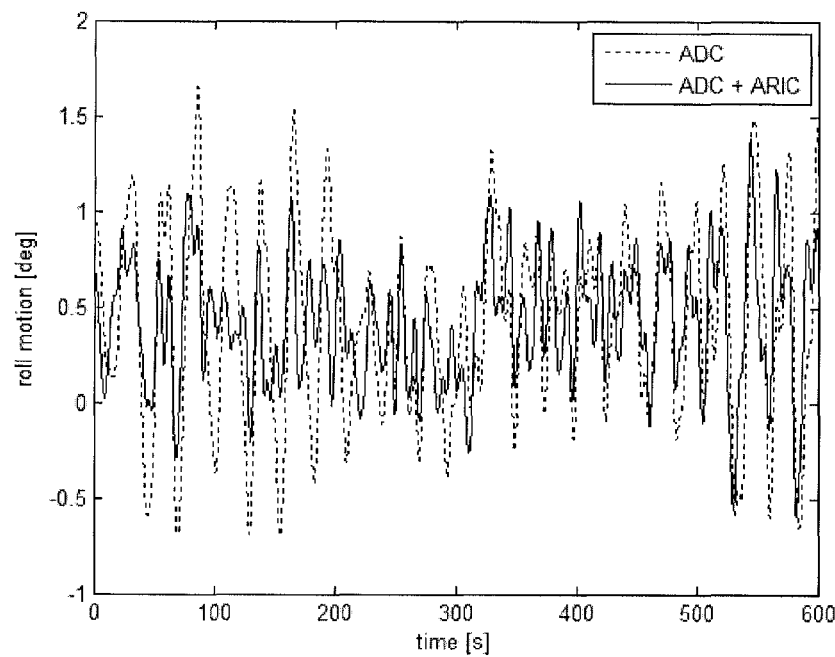
FIG. 1 shows a simulation snapshot plot with and without active in-plane damping with use of individual blade pitch control.

The active in-plane damping by use of individual blade pitch control can be applied both above and below the rated wind speed. The measured in-rotor-plane velocity could be measured directly or could be an estimate based on other measurements. A simulation snapshot plot with and without active in-plane damping with use of individual blade pitch control is shown in FIG. 1. FIG. 1 shows a time domain simulation snapshot plot of the in-plane motion for an environmental condition with significant wave height 5 m, peak period 10.7 s and mean wind speed 16.5 m/s. Conventional floating wind turbine collective blade pitch control system (ADC) and conventional system with active in-plane damping by use of individual blade pitch control (ADC+ ARIC) are shown. The simulations are carried out with measurement of the nacelle sway velocity, $K_{vr}=-0.25$ and $$\omega_c = \frac{2\pi}{20}.$$

The natural period in roll in this case is 30 seconds. A significant reduction in the in-plane motion is observed by applying ARIC, even if the parameter setting is not optimized.

Due to the nonlinear nature of the aerodynamic forces on the rotor blades, it may be advantageous to apply gain scheduling techniques to schedule the in-plane damping controller gain with the operational condition based on measurements of e.g. rotor speed, blade pitch angle and/or wind speed.

As mentioned above, an alternative method for damping of the in-rotor-plane motions of a floating wind turbine is to add an additional signal proportional to the in-rotor-plane horizontal tower velocity to the generator torque reference signal, $T_{ref}$.

Consider a measurement of the in-rotor-plane horizontal velocity $\dot{y}_n$, measured at the nacelle level. Then, an active in-plane damping control scheme can be formulated as:

$$T_{ref}=T_{ref\,0}(1+K_{tc}\dot{y}_n), \quad [9]$$

where $T_{ref\,0}$ is the original generator torque reference signal, and $K_{tc}$ is the in-plane damping generator torque controller gain.

Similarly, as in the previous section, an in-rotor-plane control scheme with low pass filtering can be desirable to avoid high frequency disturbances and use of the low pass filtering scheme in equation (8) leads to the following generator torque control scheme for active in-plane damping:

$$T_{ref}=T_{ref\,0}(1+K_{tc}\dot{y}_{nf}) \quad [10]$$

Figure 2:
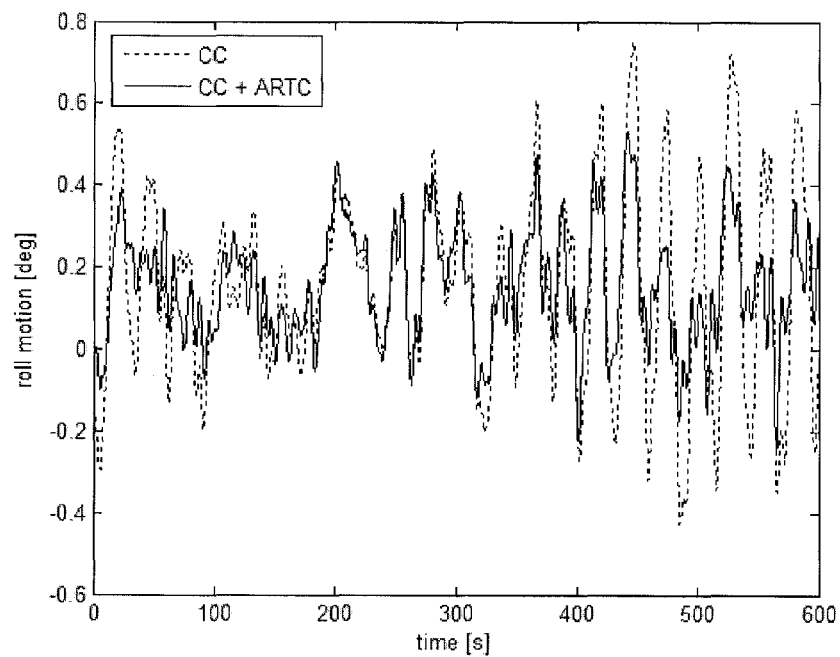
FIG. 2 shows a simulation snapshot plot with and without active in-plane damping with use of generator torque control below the rated wind speed.

The active in-plane damping by use of generator torque control is particularly suitable below the rated wind speed and the measured in-rotor-plane velocity could also be an estimate based on other measurements. A simulation snapshot plot with and without active in-plane damping with use generator torque control below the rated wind speed is shown in FIG. 2. FIG. 2 shows a time domain simulation snapshot plot of the in-plane motion at the mean water level for an environmental condition with significant wave height 2 m, peak period 8.5 s and mean wind speed 8 m/s. Conventional wind turbine control system (CC) and conventional system with active in-plane damping by use of generator torque control (CC+ARTC) are shown. The simulation is carried out with measurement of the nacelle sway velocity, $K_{tc}=3.0$ and $$\omega_c = \frac{2\pi}{20}.$$

The principle of desired blade pitch angle for generating a yaw harmonic force given in equation [3] can be transferred to a control scheme with a generally non-harmonic behaviour based on a measurement of the yaw velocity of the floating wind turbine. However, it is desirable to include proportional and/or integral control actions in addition to, or instead of, the derivative control actions indicated in equation [3]. This because the yaw motions are slowly varying and because the yaw motions are little affected by the waves.

Figure 3:
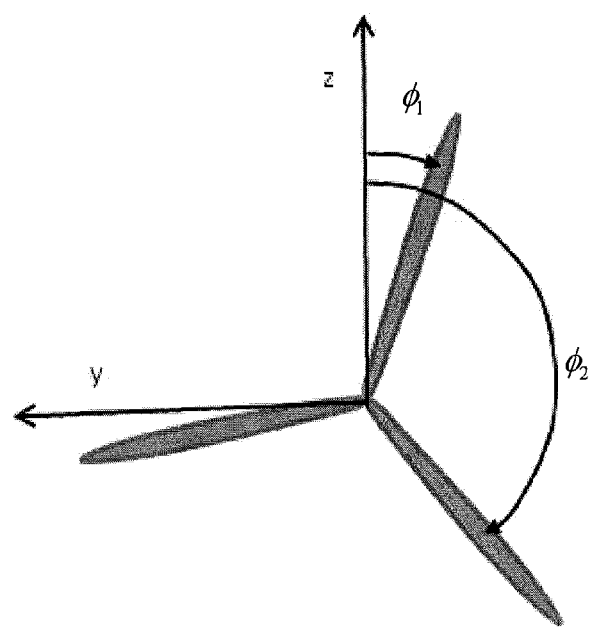
FIG. 3 shows the rotational angle of the blades as seen in the positive x-direction (wind direction)

FIG. 3 shows the rotational angle of the blades as seen in the positive x-direction (wind direction). From FIG. 3 it can be seen that a restoring yaw moment for a positive yaw motion is obtained by positive individual pitching of the rotor blades with rotor blade azimuth angles from 0 to 180 degrees and negative individual pitching of the rotor blades with rotor blade azimuth angles from 180 to 360 degrees, and opposite for negative yaw motion.

It is assumed that a smooth cyclic variation of the rotor blade pitch angles is desirable during one revolution of the rotor, and on this basis a control schedule incorporating proportional, integral, and derivative yaw motion control actions can be formulated as:

$$\beta_{ref,i}=\beta_c+\beta_{iy}, \quad [11]$$

where $\beta_{ref,i}$ is the blade pitch angle reference signal for blade i, $\beta_c$ is the collective blade pitch angle reference signal for all blades (including possibly active pitch motion damping control), while $\beta_{iy}$ is the additional yaw individual blade pitch angle reference for blade i, represented as $$\beta_{iy} = \left(K_{py}\theta + K_{iy}\int_{t_0}^{\tau}\theta(\tau)d\tau + K_{vy}\dot{\theta}\right)\sin(\phi_i), \quad [12]$$

where $\theta$ is the tower yaw angle, $\dot{\theta}$ is the tower yaw angular velocity, $K_{iy}$ is the integral controller gain, $K_{py}$ is the proportional controller gain and $K_{vy}$ is the derivative controller gain and $\phi_i$ is the azimuth angle of rotor blade i.

Figure 4:
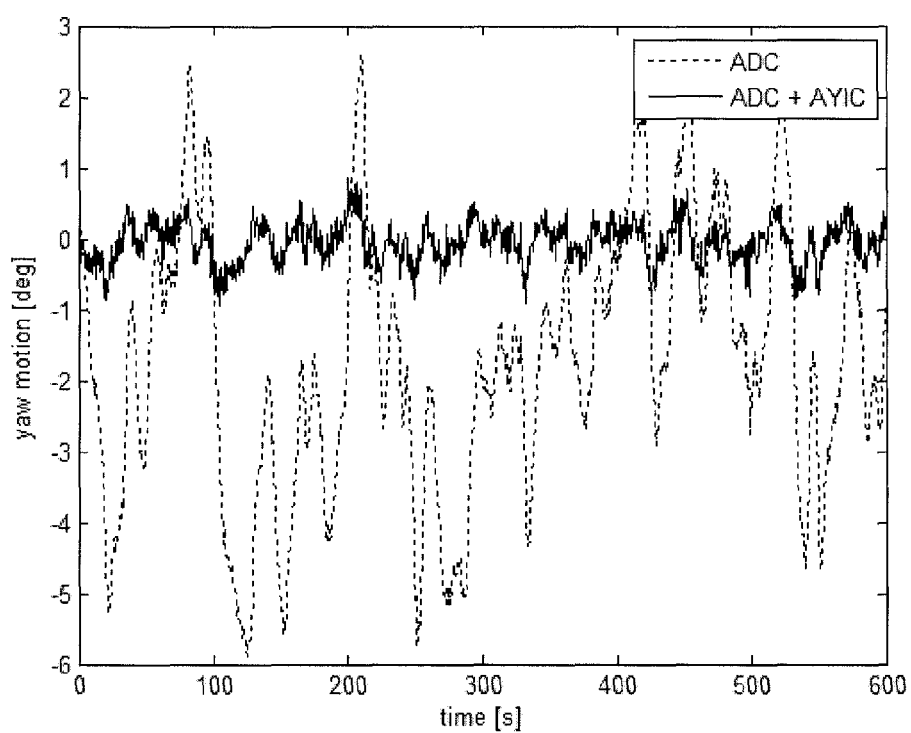
FIG. 4 shows simulation snapshot plot with and without active yaw motion control with use of individual blade pitch control.

The active yaw motion control by use of individual blade pitch control can be applied both above and below the rated wind speed. The yaw motion may be measured directly or could also be an estimate based on other measurements. A simulation snapshot plot with and without active yaw motion control with use of individual blade pitch control is shown in FIG. 4. FIG. 4 shows a time domain simulation snapshot plot of the yaw motion at the mean water level for an environmental condition with significant wave height 5 m, peak period 10.7 s and mean wind speed 16.5 m/s, i.e. above rated wind speed. Conventional floating wind turbine collective blade pitch control system (ADC) and conventional system with yaw motion control by use of individual blade pitch control (ADC+AYIC) are shown. The simulation is carried out with $K_{py}=2.5$, $K_{iy}=0.25$ and $K_{vy}=0$.

In this example the derivative controller gain is set to zero. This is because it was realised that the effect of the derivative controller action on yaw motions in floating wind turbines is negligible. The yaw motion is slowly varying with changes in the wind field so, as a result, a damping force (provided by the derivate control action) has little effect. As a result, the controller does not need to comprise a derivative control action.

Due to the nonlinear nature of the aerodynamic thrust force, it may be advantageous to apply gain scheduling techniques to schedule the yaw motion controller gains with the actual operational condition based on measurements of e.g. rotor speed, blade pitch angle and/or wind speed.

The control schemes presented above for the in-plane motion (either by blade control or torque control) can be combined (multiplied by suitable scaling factors and added together) with the control schemes for yaw motion to obtain both active in-plane damping and yaw motion control. The control schemes above are examples on implementation only and are not optimized. Optimization will employ controller settings that reduce the motions sufficiently and at the same time do not cause too large negative effects on e.g. blade loads.

The invention claimed is:

1. A motion controller for a floating wind turbine with a plurality of rotor blades, wherein the controller is arranged to adjust a blade pitch of each of the rotor blades so as to create a net force to control a motion of the floating wind turbine in a yaw direction, wherein the controller includes a control action which is proportional to a yaw offset angle and/or a control action which is proportional to an integral of the yaw offset angle, wherein the controller is adapted to calculate a dynamic and collective pitch for all of the plurality of rotor blades to counteract an axial motion of the floating wind turbine to obtain a first adjustment, calculate a dynamic and individual blade pitch for each of the plurality of blades to counteract a yaw motion of the floating wind turbine to obtain a second adjustment calculate a dynamic and individual blade pitch for each of the plurality of blades and/or a variation in rotor torque to counteract an in-plane motion of the floating wind turbine to obtain a third adjustment; and combine the first, second and third adjustments to cause simultaneous control of the axial motions, yaw motions and in-plane motions of the floating wind turbine.

2. The motion controller as claimed in claim 1, wherein the controller does not include a control action which is proportional to the derivative of the yaw off-set angle.

3. The motion controller as claimed in claim 1, wherein the controller is arranged to operate only when the yaw off-set is above a certain threshold angle.

4. The motion controller as claimed in claim 1, wherein the controller is also arranged to control a motion in the in-plane direction.

5. The motion controller as claimed in claim 1, wherein the controller is also arranged to control a motion in the axial direction.

6. The motion controller as claimed in claim 1, wherein the controller is arranged to control the motion of the floating wind turbine in a plurality of directions simultaneously.

7. The motion controller as claimed in claim 4, wherein the controller is arranged to adjust the blade pitch of each rotor blade with a phase relative to the floating wind turbine motion velocity so as to provide a damping force for at least one of the motions.

8. The motion controller as claimed in claim 1, wherein the controller is arranged to adjust the blade pitch of each rotor blade with a phase relative to the floating wind turbine motion displacement so as to provide a restoring force.

9. The motion controller as claimed in claim 1, wherein the controller is further arranged to control the torque of the load presented to the rotor to control a motion in the in-plane direction.

10. The motion controller as claimed in claim 1, wherein the input to the controller is based on a measurement of the velocity of the motions of the floating wind turbine.

11. The motion controller as claimed in claim 9, wherein the controller uses a low pass filter on the velocity input.

12. A method of controlling a floating wind turbine structure comprising a plurality of rotor blades, the method comprising:

adjusting a blade pitch of each of the rotor blades so as to create a net force to control a yaw motion of the floating wind turbine, wherein a blade pitch adjustment is calculated using a controller which includes a control action which is proportional to a yaw offset angle and/or a control action which is proportional to an integral of the yaw offset angle, wherein the controller is adapted to calculate a dynamic and collective pitch for all of the plurality of rotor blades to counteract an axial motion of the floating wind turbine to obtain a first adjustment, calculate a dynamic and individual blade pitch for each of the plurality of blades to counteract a yaw motion of the floating wind turbine to obtain a second adjustment; calculate a dynamic and individual blade pitch for each of the plurality of blades and/or a variation in rotor torque to counteract an in-plane motion of the floating wind turbine to obtain a third adjustment; and combine the first, second and third adjustments to cause simultaneous control of the axial motions, yaw motions and in-plane motions of the floating wind turbine.

13. The method as claimed in claim 12, wherein the blade pitch adjustment is calculated using a controller which does not includes a control action which is proportional to the derivative of the yaw off-set angle.

14. The method as claimed in claim 12, wherein the blade pitch is only adjusted when the yaw off-set is above a certain threshold angle.

15. The method as claimed in claim 12, wherein the method comprises adjusting a blade pitch of each rotor blade so as to create a net force to also control an in-plane motion.

16. The method as claimed in claim 12, wherein the method comprises adjusting the blade pitch of the rotor blades to also control a motion in the axial direction.

17. The method as claimed in claim 12, the method comprising controlling the motion of the floating wind turbine in a plurality of directions simultaneously.

18. The method as claimed in claim 15, the method comprising adjusting the blade pitch of each rotor blade with a phase relative to the floating wind turbine motion velocity so as to provide a damping force for at least one of the motions.

19. The method as claimed in claim 12, the method comprising adjusting the blade pitch of each rotor blade with a phase relative to the floating wind turbine motion displacement so as to provide a restoring force.

20. The method as claimed in claim 12, the method comprising controlling the torque of the load presented to the rotor to control a motion in the in-plane direction.

21. The method as claimed in claim 12, the method comprising inputting to the controller a measurement of the velocity of the motions of the floating wind turbine.

22. The method as claimed in claim 21, the method comprising using a low pass filter on the velocity input.

23. A motion controller for a floating wind turbine with a plurality of rotor blades, wherein the controller is arranged to adjust a blade pitch of each of the rotor blades so as to create a net force to control a motion of the floating wind turbine in a direction other than the axial direction, wherein the controller is arranged to only control a motion of the floating wind turbine when that motion exceeds a certain threshold.

* * * * *